3,839,366
FURFURYLIMINO COMPOUNDS
George P. Rizzi, Cincinnati, Ohio, assignor to The Procter & Gamble Company, Cincinnati, Ohio
No Drawing. Original application June 25, 1969, Ser. No. 836,606, now Patent No. 3,625,710. Divided and this application Sept. 2, 1971, Ser. No. 177,487
Int. Cl. C07d 5/16
U.S. Cl. 260—347.7                                5 Claims

ABSTRACT OF THE DISCLOSURE

Novel aldimines are useful as choclate-like or cocoa-like flavors. Examples of the novel compounds are N-isobutylidenefurfurylamine, N-isopentylidenefurfurylamine, and N-isopentylideneisopentylamine.

CROSS REFERENCE TO RELATED APPLICATION

This is a division of co-pending application Ser. No. 836,606, filed June 25, 1969, and now U.S. Pat. 3,625,710.

BACKGROUND OF THE INVENTION

This invention relates to a new class of chocolate like or cocoa-like flavors. The compounds of this class can be used *per se* to supplement, extend and fortify the flavor supplied to cakes, candy, puddings, beverages and the like by chocolate or cocoa. They can also be used as components in artificial flavor mixtures suitable for supplying chocolate or cocoa notes to food products.

SUMMARY OF THE INVENTION

The compounds of this invention which have the above-described utility are novel aldimines.

THE PRIOR ART

Imines are generally known. In this regard, see R. W. Layer, Chem. Revs, 63, 489–510 (1963). Moreover, $\Delta'$-pyrroline, a cyclic imine, is disclosed in Nakel U.S. 3,336,138 as a food flavor additive which provides a crusty, potato-like or a buttery flavor. However, the particular compounds of this invention are not known to be described in the prior art. Nor is the fact that any imines have a chocolate-like flavor known to be described in the prior art. In fact, Montgomery, M. W. and Day, E. A., J. Food Sci. 30, #5, 828–832 (1965) implies that the formation of imines in food products is detrimental to flavor.

Other prior art disclosing artificial chocolate flavors but not known to disclose the compounds of the present invention include U.S. Pats. 2,835,590; 2,835,592–593; and 2,887,384–388.

DETAILED DESCRIPTION OF THE INVENTION

The novel compounds herein have the structural formula

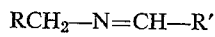

wherein either (1) R is a 2-furyl group and R' is a terminally branched alkyl group containing 3 to 6 carbon atoms; or (2) R is an isobutyl group and R' is also an isobutyl group.

These compounds include

N-isobutylidenefurfurylamine,
N-isopentylidenefurfurylamine,
N-isohexylidenefurfurylamine,
N-isoheptylidenefurfurylamine, and
N-isopentylideneisopentylamine.

N-isobutylidenefurfurylamine has the above structural formula wherein R is a 2-furyl group and R' is a terminally branched alkyl group containing 3 carbon atoms. N-isopentylidenefurfurylamine has the above structural formula wherein R is a 2-furyl group and R' is a terminally branched alkyl group containing 4 carbon atoms. N-isohexylidenefurfurylamine has the above structural formula wherein R is a 2-furyl group and R' is a terminally branched alkyl group containing 5 carbon atoms. N-isoheptylidenefurfurylamine has the above structural formula wherein R is a 2-furyl group and R' is a terminally branched alkyl group containing 6 carbon atoms. N-isopentylideneisopentylamine has the above structural formula wherein R is an isobutyl group and R' is also an isobutyl group.

These compounds are conveniently prepared by reacting appropriate aldehydes and amines according to the following reaction equation wherein R and R' have the definitions given above:

It is preferred that this reaction be carried out by adding the aldehydic component to the amine with external cooling. Optionally, an inert solvent such as ether can be added to moderate the reaction.

The 2-furyl substituted compounds of this invention can also be prepared by reacting furfural with an appropriate terminally branched alpha amino acid. For example, N-isopentylidenefurfurylamine can be prepared by reacting furfural and L-leucine.

The novel compounds of this invention can be used to supply chocolate-like or cocoa-like notes to food products. They can be used for this purpose at levels ranging from 0.5 p.p.m. to 10,000 p.p.m., based on the weight of the food product to which they are added. Preferably, these compounds are utilized at levels ranging from 1 p.p.m. to 2000 p.p.m., based on the weight of the food product to which they are added.

The novel compounds can be used in pure form or in combination with a carrier. Suitable carriers include water, ethanol, mineral oil, dextrose, starch, or gum arabic. When used in combination with a carrier to provide a amounts to from 1% to 10% by weight of the flavor composition.

The novel compounds of this invention can also be used in combination with other flavor components to provide artificial flavor mixtures suitable for supplying chocolate or cocoa notes to food products. These other flavor components include vanillin, ethyl vanillin, linalool, anisic aldehyde, and acetaldehyde. These other flavor components also include particular alkyl pyrazines. Suitable alkyl pyrazines are disclosed in Nakel and Dirks, patent application Ser. No. 677,030 filed Oct. 23, 1967, now U.S. Pat. 3,579,353. These other flavor components also include particular 2-alkylthiazolidines. These thiazolidines are described in my copending patent application Ser. No. 836,607, now U.S. Pat. 3,617,310 entitled "2-Alkylthiazolidines as Chocolate-Like Flavors" which was filed June 25, 1969.

The following Examples further illustrate the novel compounds herein, their preparation, their flavor properties, and their use in an artificial flavor mixture and in a food product to supply significantly enhanced chocolate-like or cocoa-like flavor. Examples I–IV illustrate the novel compounds herein, their preparation, and their flavor properties. Example V illustrates the use of novel compounds herein as components in artificial flavor mixtures. Example VI illustrates the use of novel compounds herein to supply an enhanced cocoa-like or chocolate-like flavor to devil's food cake.

EXAMPLE I

Preparation of N-Iisobutylidenefurfurylamine

Furfurylamine (19.4 grams, 0.20 mole) is treated dropwise with 17.7 milliliters (0.20 mole) of isobutyraldehyde; the temperature of the reaction is maintained near 25° C. with intermittent ice-cooling. After completion of the addition (about 10 minutes), the mixture is stirred for 30 minutes at 25° C. and treated with NaOH pellets to absorb water which forms in the reaction. Ordinary work up with ether followed by distillation yields 16.3 grams of analytically pure N - isobutylidenefurfurylamine boiling from 82–83° C. under 11 millimeters Hg pressure. Analysis: Calculated for $C_9H_{13}NO$: C=71.2%, H=8.9%, N=9.3%; Found: C=71.5%; H=8.7% and N=9.5%.

Some of the above-formed N-isobutylidenefurfurylamine is admixed with mineral oil so as to be present in the combination at a level of 1 p.p.m. by weight. The combination gives sweet chocolate aroma sensation.

The N-isobutylidenefurfurylamine sniffed in water at a level of 1 p.p.m. by weight gives a chocolate aroma sensation.

EXAMPLE II

Preparation of N-Isopentylidenefurfurylamine

Furfurylamine (15.57 grams, 0.15 mole) is treated dropwise with 16.1 milliliters (0.15 mole) of isovaleraldehyde; the temperature of the reaction is maintained near 25° C. with intermittent ice-cooling. After completion of the addition (about 10 minutes), the mixture is stirred 30 minutes at 25° C. and treated with NaOH pellets to absorb water which forms in the reaction. Ordinary work up with ether yields 25.2 grams of crude product which on distillation gives 19.9 grams of analytically pure N-isopentylidenefurfurylamine (hereinafter referred to as IPFA) boiling from 92–97° C. under 12 millimeters Hg pressure. Analysis: Calculated for $C_{10}H_{15}NO$:

C=72.69%;

H=9.15%, N=8.48%; Found: C=72.0%, H=9.4% and N=8.5%. The IPFA when sniffed at a level of 1 p.p.m. by weight in either mineral oil or water gives a chocolate aroma sensation.

N-isohexylidenefurfurylamine is formed when an equivalent amount of 4-methylpentanal is subsituted for the isovaleraldehyde above. N-isoheptylidenefurfurylamine is formed when an equivalent amount of 5-methylhexanal is substituted for the isovaleraldehylde above. These products when sniffed in mineral oil or water at a 1 p.p.m. by weight level give a chocolate aroma sensation.

EXAMPLE III

Preparation of N-isopentylidenefurfurylamine

A slurry of L-leucine (13.8 grams, 0.15 mole) in 50 milliliters anhydrous diglyme is treated with 9.61 grams (0.10 mole) of redistilled furfural. The mixture is stirred and refluxed under a nitrogen atmosphere for 2 hours. The resulting reaction mixture having cooled is steam distilled and the aqueous distillate (500 milliliters) is saturated with solid NaCl and extracted with ether (3 times with 100 milliliters each time). The combined ether phase is back-extracted with water (5 times with 50 milliliters each time), washed with saturated brine and dried over anhydrous $MgSO_4$. Evaporation of the ether under reduced pressure gives 13.7 grams of crude product. Distillation of the crude product gives 1.73 grams of substantially pure N-isopentylidenefurfurylamine (IPFA). The IPFA when sniffed at a level of 1 p.p.m. by weight in either mineral oil or water gives a chocolate aroma sensation.

EXAMPLE IV

Preparation of N-Isopentylideneisopentylamine

Isopentylamine (29.0 milliliters, 0.25 mole) is treated dropwise with 26.9 milliliters (0.25 mole) of isovaleraldehyde. The temperature of the reaction is maintained near 25° C. with intermittent ice-cooling. Workup similar to that described in Example I gives 35.2 grams of product having a boiling range of 66–68° C. at 12–13 millimeters Hg pressure. The product is shown to be substantially pure N-isopentylideneisopentylamine (IPPA) by the following elemental analysis: Calculated for $C_{10}H_{21}N$: C=77.4%, H=13.6%, N=9.04%; Found: C=76.7%, H=13.5%, and N=9.9%.

The IPPA when sniffed at a level of 1 p.p.m. by weight in water gives a chocolate aroma sensation.

EXAMPLE V

Artificial Chocolate Flavor Mixture

An artificial chocolate flavor mixture is made up containing the following percentages of ingredients:

| Component: | Weight percentage |
|---|---|
| N-isobutylidenefurfurylamine | 50.0 |
| Methylpyrazine | 3.5 |
| 2,5-dimethylpyrazine | 9.75 |
| 2,6-dimethylpyrazine | 9.75 |
| 2,3-dimethylpyrazine | 3.0 |
| Trimethylpyrazine | 5.5 |
| 2-ethyl-5-methylpyrazine | 7.75 |
| 2,5-dimethyl-3-ethylpyrazine | 5.5 |
| 2,6-dimethyl-3-ethylpyrazine | 3.0 |
| Tetramethylpyrazine | 2.25 |
| | 100.0 |

The above artificial chocolate flavor mixture when sniffed in water or mineral oil at a 2 p.p.m. by weight level gives a very rich chocolate aroma. This chocolate aroma is significantly richer than the aroma sensation given by 1 p.p.m. N-isobutylidenefurfurylamine alone in water.

Similar results of very rich chocolate aroma sensation are achieved when equal weights of N-isopentylidenefurfurylamine or N-isopentylideneisopentylamine are substituted for the N-isobutylidenefurfurylamine in the above artificial chocolate flavor mixture.

EXAMPLE VI

Use of N-isopentylideneisopentylamine to enhance the chocolate-like or cocoa-like flavor of devil's food cake A devil's food dry mix is prepared having the following composition:

| Ingredient: | Percent By Weight |
|---|---|
| Flour (soft wheat cake flour including 0.5% by weight high-protein wheat flour) | 38.18 |
| Sugar (industrial fine granulated sucrose and dextrose) | 39.30 |
| Shortening [1] | 11.00 |
| Sodium bicarbonate | 2.45 |
| Sodium aluminum phosphate | 0.70 |
| Nonfat milk solids | 1.00 |
| Carboxymethyl cellulose | 0.20 |
| Salt | 1.00 |
| Cocoa | 6.00 |
| Butter-like flavor | Balance |

[1] The shortening is prepared by melting together the following and plasticizing by rapidly cooling with agitation (percentages are by weight):
80% vegetable oil shortening comprising about 80% soybean oil and 20% cottonseed oil, which have been refined, bleached, deodorized and hydrogenated to an iodine value of about 60;
14.0% alpha-phase crystal-tending emulsifiers comprised of 10% propylene glycol monostearate and 4% rapeseed glyceride;
0.25% hightemperature batter stabilizer comprised of stearic acid; and
5.75% propylene glycol distearate (an inert by-product from propylene glycol monostearate preparation).

The mix is prepared by blending together thoroughly the flour, sugar and shortening in a paddle mixer, and then passing the blend through a roller mill. After the milling step, the remaining ingredients are added, and the resulting mixture is processed in an entoleter.

Batter is then made by adding three whole eggs and 1.33 cups of water to 19 ounces of the mix. To this batter is added a dispersion of N-isopentylideneisopentylamine (IPPA) in dextrose (5% by weight IPPA and the remainder dextrose) to provide in the batter 200 p.p.m. IPPA based on the weight of the dry mix in the batter. The batter is then mixed in a conventional household electric mixer for 3 minutes at high speed (875 r.p.m.) and for 1 minute at medium speed (450 r.p.m.). A nine-inch cake pan is filled with 492 grams of batter and baked at 350° F. for 32 minutes.

The resulting devil's food cake has significantly more cocoa-like flavor than devil's food cake made the same but without the addition of the IPPA.

Similar results of significantly more cocoa-like flavor are achieved when cake is made as above except that IPPA-dextrose dispersion is added to provide 500 p.p.m., 600 p.p.m., 1000 p.p.m. or 1500 p.p.m. IPPA by weight of the dry mix in the batter insead of 200 p.p.m.

Devil's food cake is made the same as above except that instead of IPPA, N-isobutylidenefurfurylamine (IBFA) is added to the batter to provide in the batter 200 p.p.m. IBFA based on the weight of the dry mix in the batter. The resulting cake has significantly more milk chocolate flavor than cake made the same but without addition of IBFA.

Silimar results of significant more milk chocolate are achieved when cake is made as in the above paragraph except that IBFA-dextrose dispersion is added to provide 500 p.p.m., 600 p.p.m., 1000 p.p.m., or 1500 p.p.m. IBFA by weight of the dry mix in the batter instead of 200 p.p.m.

Similar results of significantly more cocoa-like or chocolate-like flavor are achieved in devil's food cake when equal amounts of N-isopentylidenefurfurylamine, N-isohexylidenefurfurylamine, or N-iosheptylidenefurylamine are substituted for the IPPA or IBFA above.

What is claimed is:

1. An aldimine of the formula $$RCH_2-N=CH-R'$$

wherein R is 2-furyl and R' is a terminally branched alkyl group containing from 3 to 6 carbon atoms.

2. The aldimine of claim 1 wherein R' is isopropyl.
3. The aldimine of claim 1 wherein R' is a terminally branched alkyl group having 4 carbon atoms.
4. The aldimine of claim 1 wherein R' is a terminally branched alkyl group having 5 carbon atoms.
5. The aldimine of claim 1 wherein R' is a terminally branched alkyl group having 6 carbon atoms.

References Cited
UNITED STATES PATENTS 3,565,954   2/1971   Bouniot _____ 260—347.7 X

OTHER REFERENCES

*Beilstein*: Organische Chemie., Berlin (1922), Band 4, p. 189.

JOHN D. RANDOLPH, Primary Examiner

B. DENTZ, Assistant Examiner